United States Patent
Pappu et al.

(10) Patent No.: US 11,444,909 B2
(45) Date of Patent: *Sep. 13, 2022

(54) LATENT USER COMMUNITIES

(71) Applicant: Oath Inc., New York, NY (US)

(72) Inventors: Aasish Pappu, Rego Park, NY (US); Troy Chevalier, San Mateo, CA (US); Xue Wu, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/699,962

(22) Filed: Dec. 2, 2019

(65) Prior Publication Data

US 2020/0106734 A1    Apr. 2, 2020

Related U.S. Application Data

(63) Continuation of application No. 15/446,913, filed on Mar. 1, 2017, now Pat. No. 10,498,690.

(51) Int. Cl.
| | |
|---|---|
| *G06F 16/35* | (2019.01) |
| *H04L 51/52* | (2022.01) |
| *H04L 67/50* | (2022.01) |
| *G06Q 50/00* | (2012.01) |
| *G06F 16/335* | (2019.01) |
| *H04L 51/00* | (2022.01) |

(52) U.S. Cl.
CPC ........... *H04L 51/32* (2013.01); *G06F 16/335* (2019.01); *G06F 16/35* (2019.01); *G06Q 50/01* (2013.01); *H04L 67/22* (2013.01); *H04L 51/16* (2013.01)

(58) Field of Classification Search
CPC ....... G06F 16/35; G06F 16/355; H04L 51/32; H04L 67/22; H04L 51/16; G06Q 50/01
See application file for complete search history.

(56) References Cited

U.S. PATENT DOCUMENTS

| | | | |
|---|---|---|---|
| 2003/0074400 A1* | 4/2003 | Brooks | H04L 63/102 707/E17.109 |
| 2015/0262069 A1* | 9/2015 | Gabriel | G06F 16/9535 706/48 |
| 2018/0181572 A1* | 6/2018 | Guo | G06F 16/9535 |

* cited by examiner

*Primary Examiner* — Kris E Mackes
(74) *Attorney, Agent, or Firm* — Cooper Legal Group LLC (57) ABSTRACT

A method implemented by at least one server computer is provided, including: providing, over the Internet, access to a plurality of topics, wherein each topic includes, and further provides access to, a plurality of posted items; recording interaction data for the plurality of topics, the interaction data identifying user activity occurring within each of the topics; analyzing the interaction data to identify clusters of topics that exhibit similar behavioral patterns; for each cluster of topics, generating a community that includes the topics in the cluster; providing, over the Internet, access to the communities, wherein accessing a given community further provides access to the topics included in that community, which further provide access to the posted items that are included in the topics within that community.

20 Claims, 7 Drawing Sheets

LATENT USER COMMUNITIES

RELATED APPLICATION

This application claims priority to and is a continuation of U.S. application Ser. No. 15/446,913, filed on Mar. 1, 2017, entitled "LATENT USER COMMUNITIES", which is incorporated herein.

BACKGROUND

The present disclosure relates to methods and systems for determining latent user communities based on online activity.

Community based recommendation of content is an interesting and active area of research. Such recommendations often drive user engagement with the platform of discussion (e.g., Reddit, Yahoo! Newsroom). Existing platforms of discussion such as Reddit, Digg, and other moderated forums do not leverage the temporal dynamics of a platform to improve topic/community recommendation for existing or new users.

It is in this context that implementations of the disclosure arise.

SUMMARY

Community based recommendation of content is an interesting and active area of research, as such recommendations often drive user engagement with the platform of discussion (e.g., Reddit). Implementations in accordance with the present disclosure provide a temporally-dynamic community-driven exploration method for users. Latent social network dynamics are analyzed to enable grouping of topics (e.g. "Vibes" in Yahoo! Newsroom) into high-level communities. These communities are latent in nature because they reflect underlying social connections that bind the users. It is possible to model these connections by observing community activity (e.g., volume of posts, social signals, topical distribution of comments) triggered by real-life events. A community can be considered as a cluster or collection of topics where a new topic can be added or removed from a given community as time progresses. Such modeling effectively captures the dynamics of an ever-evolving social network. The community can have a label assigned by the editors or even by the users themselves.

By understanding user behavior through identification of latent communities, it is possible to provide community-based content recommendation solutions. Broadly, this could mean several things, for example: (a) recommending specific posts, (b) recommending topics in strongly connected communities that the user is following, and (c) allowing users to follow communities (dynamic sets of changing topics). The latter of these is significant in that there is no existing notion of collections of related topics that are generated from latent community identification as in implementations of the present disclosure.

Additionally, implementations of the present disclosure enable modeling and visualization of the latent communities that make up the users and topics. This can be used both for informational dashboards and exploratory analysis.

In some implementations, a method implemented by at least one server computer is provided, including: providing, over the Internet, access to a plurality of topics, wherein each topic includes, and further provides access to, a plurality of posted items; recording interaction data for the plurality of topics, the interaction data identifying user activity occurring within each of the topics; analyzing the interaction data to identify clusters of topics that exhibit similar behavioral patterns; for each cluster of topics, generating a community that includes the topics in the cluster; providing, over the Internet, access to the communities, wherein accessing a given community further provides access to the topics included in that community, which further provide access to the posted items that are included in the topics within that community.

In some implementations, analyzing the interaction data includes: determining a covariance amongst the plurality of topics using the interaction data; generating a sparse graph using the determined covariance; processing the sparse graph to identify the clusters of topics that exhibit similar behavioral patterns.

In some implementations, determining the covariance amongst the plurality of topics includes generating a covariance matrix using the interaction data; wherein generating the sparse graph includes applying a graphical lasso to the covariance matrix; wherein processing the sparse graph includes applying a stochastic block model to the sparse graph.

In some implementations, the interaction data defines a time-dependent metric for user activity within the plurality of topics, and wherein the similar behavioral pattern for a given cluster of topics is defined by similar changes in the time-dependent metric occurring over time for the given cluster of topics.

In some implementations, the interaction data includes a number of one or more of active users, posted items, comments, votes, positive endorsements, negative endorsements, flags, moderator actions.

In some implementations, providing access to a given topic includes providing an interface for posting items within the given topic, and for interacting with posted items in the given topic, and wherein the interaction data includes data obtained via the interface.

In some implementations, the user-posted items include news articles.

In some implementations, a method implemented by at least one server computer is provided, including: providing, over the Internet, access to a plurality of topics, wherein each topic includes, and further provides access to, a plurality of posted items; recording interaction data for the plurality of topics, the interaction data identifying user activity occurring within each of the topics; analyzing the interaction data to identify clusters of topics that exhibit similar behavioral patterns; using the identified clusters of topics to identify topics for recommendation to a user; presenting, over the Internet, the topics identified for recommendation in a session for the user.

In some implementations, the topics for recommendation are identified based on identifying a topic to which the user has subscribed, and identifying further topics that are within a same cluster as the topic to which the user has subscribed.

In some implementations, analyzing the interaction data includes: determining a covariance amongst the plurality of topics using the interaction data; generating a sparse graph using the determined covariance; processing the sparse graph to identify the clusters of topics that exhibit similar behavioral patterns.

In some implementations, determining the covariance amongst the plurality of topics includes generating a covariance matrix using the interaction data; wherein generating the sparse graph includes applying a graphical lasso to the covariance matrix; wherein processing the sparse graph includes applying a stochastic block model to the sparse graph to generate clusters.

In some implementations, the interaction data defines a time-dependent metric for user activity within the plurality of topics, and wherein the similar behavioral pattern for a given cluster of topics is defined by similar changes in the time-dependent metric occurring over time for the given cluster of topics.

In some implementations, the interaction data includes a number of one or more of active users, posted items, comments, votes, positive endorsements, negative endorsements, abuse flags, moderator actions.

In some implementations, providing access to a given topic includes providing an interface for posting items within the given topic, and for interacting with posted items in the given topic, and wherein the interaction data includes data obtained via the interface.

In some implementations, the user-posted items include news articles.

In some implementations, a method implemented by at least one server computer is provided, including: providing, over the Internet, access to a plurality of topics, wherein each topic includes, and further provides access to, a plurality of posted items; recording interaction data for the plurality of topics, the interaction data identifying user activity occurring within each of the topics; analyzing the interaction data to identify clusters of topics that exhibit similar behavioral patterns; using the identified clusters to recommend specific user-posted items.

In some implementations, using the identified clusters to recommend specific user-posted items further includes, identifying a first topic to which a user has subscribed, identifying a second topic that is within a same cluster as the first topic, and recommending in a session of the user a posted item from the second topic.

In some implementations, analyzing the interaction data includes: determining a covariance amongst the plurality of topics using the interaction data; generating a sparse graph using the determined covariance; processing the sparse graph to identify the clusters of topics that exhibit similar behavioral patterns.

In some implementations, determining the covariance amongst the plurality of topics includes generating a covariance matrix using the interaction data; wherein generating the sparse graph includes applying a graphical lasso to the covariance matrix; wherein processing the sparse graph includes applying a stochastic block model to the sparse graph.

In some implementations, the interaction data defines a time-dependent metric for user activity within the plurality of topics, and wherein the similar behavioral pattern for a given cluster of topics is defined by similar changes in the time-dependent metric occurring over time for the given cluster of topics.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

The following implementations describe systems and methods for determining latent user communities based on online activity. It will be obvious, however, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific example implementations. Subject matter may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, implementations may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. It is intended, for example, that claimed subject matter include combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Community based recommendation of content is an interesting and active area of research. Such recommendations often drive user engagement with the platform of discussion (e.g., Reddit, Yahoo! Newsroom). Existing platforms of discussion such as Reddit, Digg, and other moderated forums do not leverage the temporal dynamics of a platform to improve topic/community recommendation for existing or new users.

Implementations of the present disclosure provide a temporally-dynamic community-driven exploration method for users. Latent social network dynamics are identified to enable grouping of topics (e.g. "Vibes" in Yahoo! Newsroom) into high-level communities. These communities are "latent" in nature because they reflect underlying social connections that bind the users. These connections can be modeled by observing community activity (e.g., volume of posts, social signals, topical distribution of comments) triggered by real life events. A community can be considered as a cluster or collection of topics where a new topic can be added or removed from the community as the time progresses. This effectively captures the dynamics of an ever-evolving social network. The community can have a label assigned by the editors or even by the users themselves.

By understanding such user behavior, it becomes possible to provide a latent community based content recommendation solution. Broadly this can mean several things, for example: recommending specific posts, recommending topics in strongly connected communities that the user has subscribed to, and allowing users to subscribe to communities (dynamic sets of changing topics). For example, a "Politics" community may contain several related topics such as "Donald Trump," "Hillary Clinton," "Bill Clinton," "Debate 2016," etc. Similarly, a post which is posted to the "Donald Trump" topic can be posted to topics that belong to the same community with higher confidence. This avoids the problem of one having to "repost" a post from a "Donald Trump" topic to, for example, an "Elections" topic manually. This could be easily avoided by posting a post to a Community that includes both topics, instead of to a specific topic only.

Implementations of the present disclosure enable modeling and visualization of the latent communities that are defined by the users and topics. This can be used both for informational dashboards and exploratory analysis. This could also be used to optimize the placement of topics next to each other or avoid placing potentially unrelated topics next to each other (e.g. avoiding placing "Yahoo" and "Google" topics next to "War on Drugs" and/or "Al Qaeda" topics).

Broadly speaking, a method in accordance with implementations of the disclosure, for identifying latent user communities based on topic-related user activity, includes the following steps: extract daily activity of users from different topics to construct a time series for each topic over a period of time; construct a covariance matrix based on the time-series for these topics; apply graph-lasso to the matrix to estimate a sparse graph for the topics; apply block-stochastic algorithm to split the graph into clusters, so that topics that are similar (by user activity) will be clustered together. The block-stochastic algorithm assigns soft-membership to each topic with a posterior probability, and therefore one can loosely group a topic under several communities.

This method provides several advantages over prior art methods. By automatically learning the structure of the underlying latent communities, the system can do a significantly better job at both recommending topics that a user might be interested in following and in ranking user posts. These improvements lead to increased product performance and better user retention.

Further, because the system observes user activity over time, i.e., it is temporally-dynamic, the system can capture the dynamics of an ever-evolving social network. Existing systems require the use of human editors to accomplish this. Having an algorithmic-based solution is both faster and more cost efficient.

Existing social networks that encourage users to share/comment on articles do not recommend temporally evolving communities (e.g. Reddit, Digg, Quora, Stumbleupon, Buzzfeed, etc.). By contrast, implementations in accordance with the present disclosure provide an exploration method for users that implicitly recommends temporally evolving communities that consist of topics. In some implementations, topics are generated by editors. In some implementations, topics can be generated by users of the social sharing platform.

Figure 1:
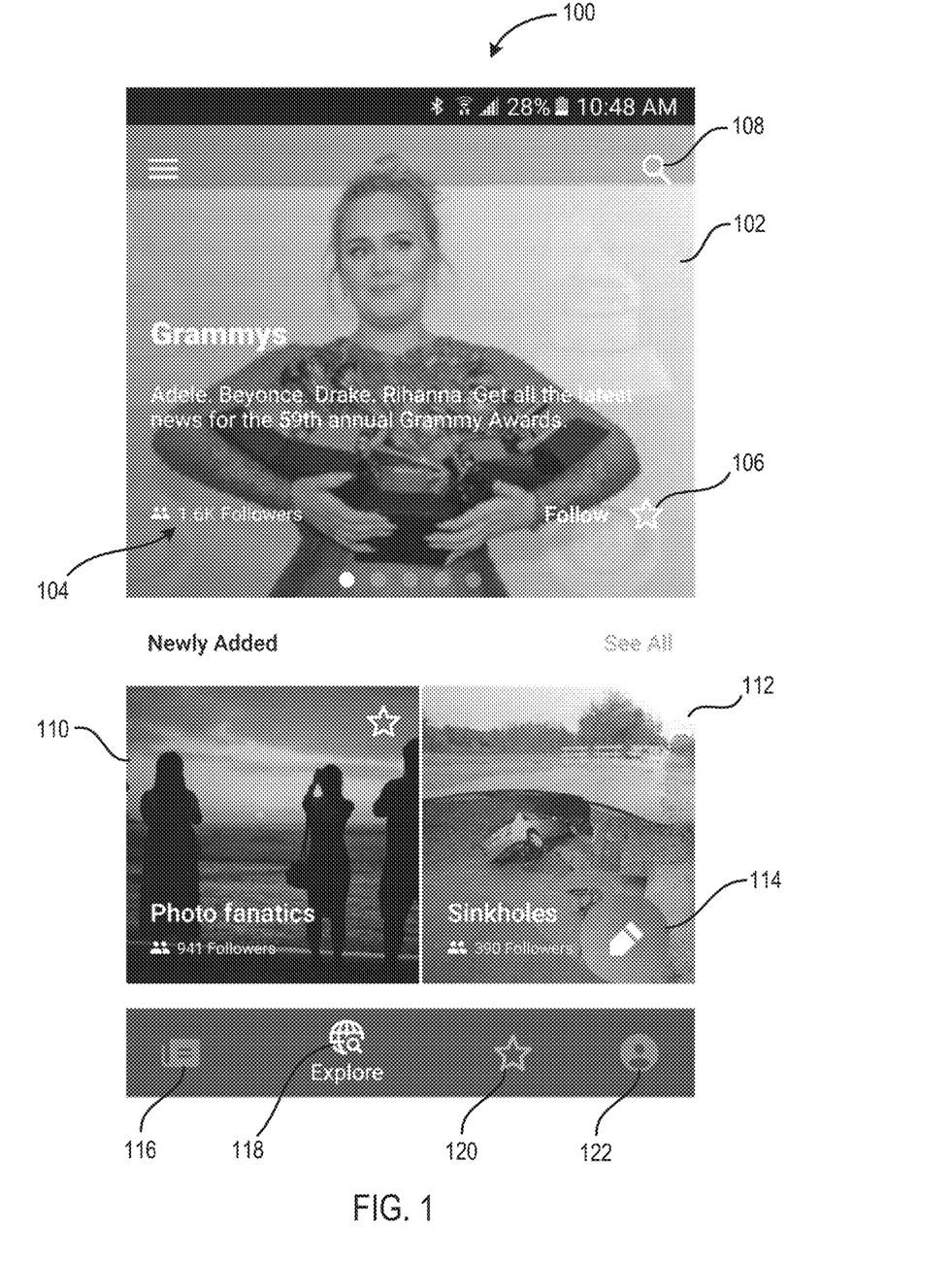
FIG. 1 illustrates an interface for browsing topics in an application configured for presenting Internet content/articles to a user, in accordance with implementations of the disclosure.

FIG. 1 illustrates an interface for browsing topics in an application configured for presenting Internet content/articles to a user, in accordance with implementations of the disclosure. In the illustrated implementation, a screenshot 100 shows an interface from the Yahoo! Newsroom application for mobile devices, which is one example of an application configured to present Internet content/articles to users. In the present view of the interface, various topics are graphically represented by icons. For example, the icon 200 represents the topic "Grammys."

For purposes of the present disclosure, a topic will be understood as a subject identifier for social sharing of Internet content/articles (e.g. news articles). By accessing a given topic, a user can further access articles that are associated with, or included within, that topic. Users can post content in association to a topic, whereupon such content will become accessible to others viewing that topic. It will be appreciated that users can include individual persons as well as entities (e.g. news publication entities). Furthermore, users may subscribe to individual topics, and thereby have content from their subscribed topics presented in their personal feeds. Thus, topics provide a classification mechanism for organizing Internet content in the context of a social sharing platform, that enables content of a given topic to be presented alongside other content that is related to the same topic. In some implementations, a topic can be implemented as a tag that can be utilized to surface content in association with that tag. Users can interact with content or postings of a given topic, such as by posting comments and/or providing social signals such as indicating endorsement ("like," thumbs-up, upvote, etc.) or disapproval (thumbs-down, downvote), flagging (e.g. as abusive, inappropriate, etc.), etc. Thus, topics can also serve as conversation areas for users to express their thoughts and reactions in relation to specific subjects.

One example of a topic, in accordance with implementations of the disclosure, is the "Vibe" on the Yahoo! Newsroom platform. Another example of a topic is the "subreddit"

on the Reddit platform. Topics are user-driven in the sense that users are able to post content in association with topics of their choosing. It should be appreciated that the content contained within a given topic can be any of various kinds of Internet content that users may interact with, including, without limitation, articles (e.g. news, blog, etc.), images, videos, comments, discussion threads, reposts of content, etc.

In some implementations, the region of the interface occupied by icon 102 can be configured to show a series of featured topics, one at a time, with others in the series being accessible in response to, for example, swiping sideways. The featured topics can be recommended to a user based on a variety of factors, such as popularity (current or trending), geo-location of the user, historical activity of the user, user preferences, etc. Furthermore, as discussed in further detail herein, topics may be recommended on the basis of their relationship to other topics to which the user has subscribed, as determined in accordance with the methods described in the present disclosure.

With continued reference to FIG. 1, the icon 102 identifying the topic "Grammys" further includes an indication 104 of the number of followers/subscribers to the topic. Additionally, a button (star) 106 can be selected by the user in order to follow or subscribe to the topic "Grammys" By subscribing to a given topic, then that topic is associated with the user's account. Further, in some implementations, a combined feed of articles from the user's subscribed topics can be provided, e.g. in a Newsroom view that is accessed when the icon 116 is selected.

A search button 108 can be selected to enable a user to search for topics by name. A post button 114 provides access to an interface for enabling the user to post a content item, such as a news article or other Internet content, to a chosen topic. Also shown in the illustrated implementation are icons 110 and 112, which represent a "Photo fanatics" topic and a "Sinkholes" topic, respectively.

It will be appreciated that by selecting the icon representing a particular topic, then access is provided to content that is within, or associated with, that topic. For example, selecting the icon 102 will provide access to articles that are classified within the "Grammys" topic. Selecting the icon 110 will provide access to articles within the "Photo fanatics" topic. Selecting the icon 112 will enable the user to view content within the "Sinkholes" topic.

Along the bottom portion of the interface shown is a series of buttons/icons for accessing different portions of the Yahoo! Newsroom application. In the illustrated view, the button 118 is currently selected, thereby accessing an "Explore" view that enables exploration of vibes/topics within the Newsroom platform. The button 116 can be selected to access a "Newsroom" view that provides a personalized feed of content based on the topics to which the user has subscribed. The personalized feed features articles from topics to which the user has subscribed. In various implementations, the feed can be further personalized based on various factors, such as the user's current location, a current time of day, current popularity or trends with respect to particular articles, the user's historical browsing history of articles and preferences ascertained therefrom, etc.

The button 120 is selectable to access a view of the topics to which the user has subscribed. This enables the user to delve specifically into particular topics that they are following, to view articles within a particular topic. And the button 122 is selectable to access a profile view for the user, enabling view and editing of various personal profile information, such as user name, personal picture, background picture, residence, contact information, etc.

Figure 2:
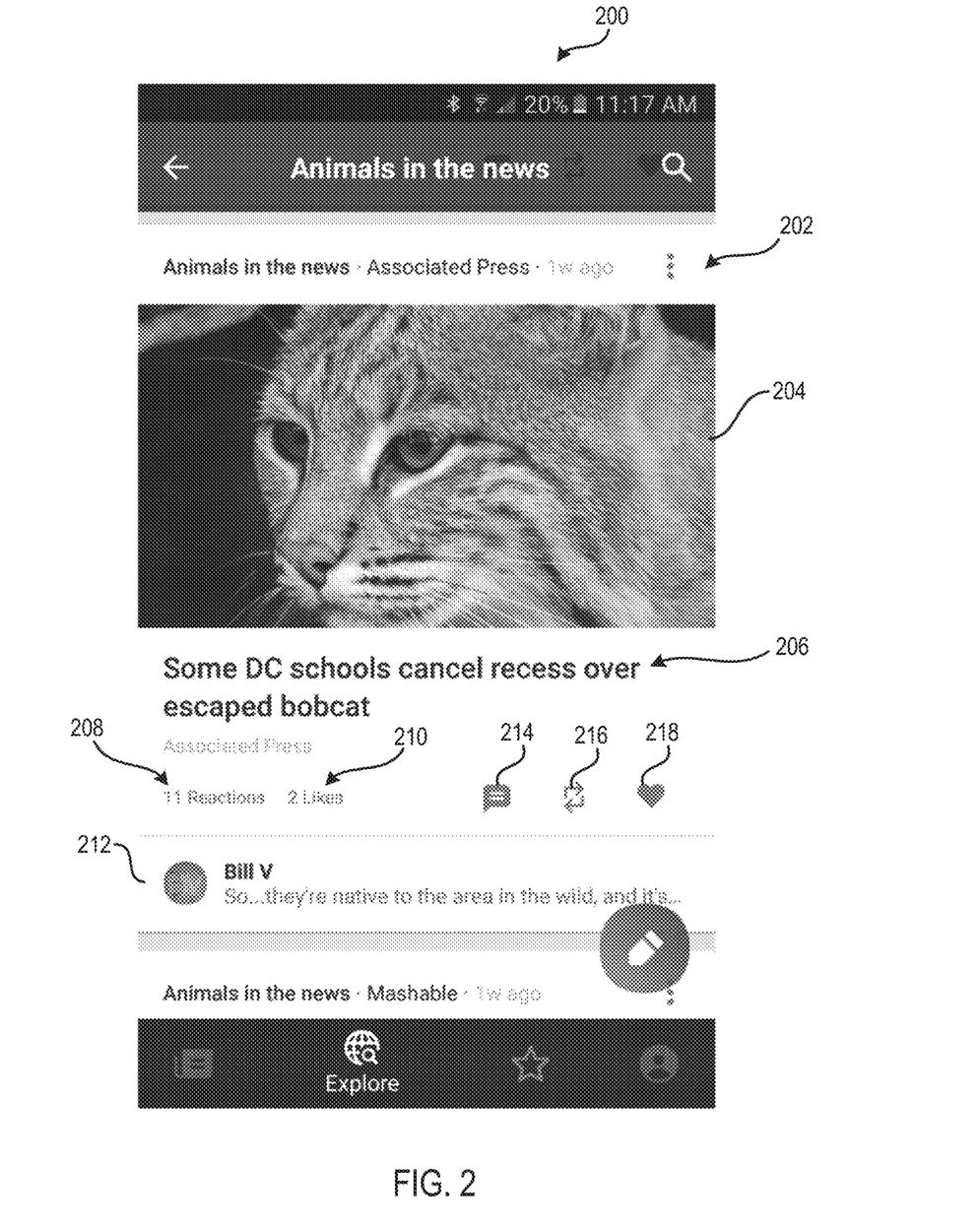
FIG. 2 illustrates an interface showing presentation of content within a topic, in accordance with implementations of the disclosure.

FIG. 2 illustrates an interface showing presentation of content within a topic, in accordance with implementations of the disclosure. A screenshot 200 is shown, illustrating a view of an interface for exploring content within a topic. In the illustrated implementation, the interface is configured to show content within the topic "Animals in the news." A stream or feed is shown that is configured to present various previews of articles/content within the "Animals in the news" topic. It will be appreciated that the stream can be scrolled to enable viewing of additional article previews. The previews are selectable to enable viewing of the entire articles/content which they represent. It will be appreciated that selection of a preview to view the actual article can be considered as a "view" of the article for purposes of ascertaining user activity. By way of example, the preview 202 is shown for a news article entitled "Some DC schools cancel recess over escaped bobcat."

The preview 202 includes a representative image 204, which can be an image from the article itself, that may be scaled, cropped, or otherwise adjusted to fit within the context of the preview. In some implementations, a representative video can be shown in the case of an article that includes a video. A caption 206 provides a brief description of the article, which may be a title or other representative text from the article, such as a section heading, opening phrase/sentence, picture/video caption, etc. An indication of the number of reactions/comments posted in response to the article is shown at reference 208. An indication of the number of "likes"/endorsements by users is shown at reference 210. A comment 212 is displayed alongside the article preview, which is one of the comments which have been posted by the users. In some implementations, the comment shown can be periodically cycled to display different ones of the comments that are associated with the article.

The icon/button 214 is selectable to access an interface for posting a comment/reaction to the article. The icon 216 is selectable to access an interface that enables reposting of the article to another topic/vibe. The icon 218 is selectable to indicate endorsement (or a "like") of the article by the user.

Figure 3:
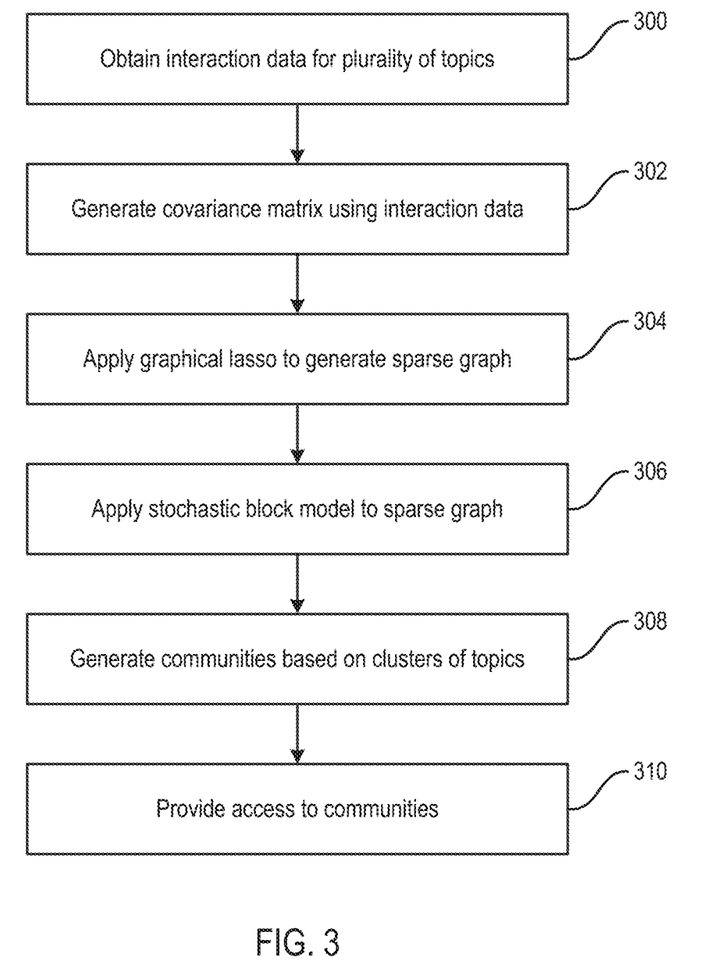
FIG. 3 illustrates a method for identifying latent communities based on topical activity, in accordance with implementations of the disclosure.

FIG. 3 illustrates a method for identifying latent communities based on topical activity, in accordance with implementations of the disclosure. Broadly speaking, it has been discovered that users participating in a platform having a plurality of topics, as discussed above, can be determined to be members of certain latent communities. These communities are latent in the sense that they are not explicitly defined, but can be inferred through analysis of the user activity and usage patterns occurring across topics.

At method operation 300, interaction data for a plurality of topics is obtained. The interaction data can include data describing any type of interaction occurring in relation to the topics, as a function of time (e.g. an activity amount on an hourly/daily/weekly basis). It will be appreciated that in various implementations, various types of interactions can be considered, alone or in combination, and may include any of the user activity types described herein with respect to a plurality of topics. By way of example, without limitation, such interactions can include views, comments, likes, endorsements, thumbs-up, thumbs-down, upvote, downvote, shares, reposts, flags, moderator actions (e.g. removing flagged posts), etc. Thus, examples of activity amounts by time for a topic include hourly number of active users, daily number of comments, etc.

In further implementations, the interaction data can describe trends in activity for a given topic, such as may be defined by a first order derivative indicating the rate of change in an activity amount, or a second order derivative indicating the trend in the rate of change.

At method operation 302, a covariance matrix is generated using the interaction data. The covariance matrix is configured to mathematically describe the covariance between each of the topics with each other. The covariance between two topics indicates the covariate correlation between them, with a higher correlation corresponding to a higher value. Thus in a general sense, the covariance matrix provides an indication of the behavioral similarity of each topic as compared to each other topic in the plurality of topics, with respect to the activity of interest occurring over time.

By way of example, Table I below illustrates an example of interaction data that is a time series of daily posts for Topics A, B, C, and D over the course of four days.

TABLE I

| # Posts | 10/21/16 | 10/22/16 | 10/23/16 | 10/24/16 |
|---|---|---|---|---|
| Topic A | 200 | 123 | 120 | 123 |
| Topic B | 114 | 1215 | 1233 | 345 |
| Topic C | 123 | 954 | 994 | 123 |
| Topic D | 152 | 23 | 21 | 12 |

Table II below illustrates a covariance matrix constructed from the above data of Table I.

TABLE II

| | Topic A | Topic B | Topic C | Topic D |
|---|---|---|---|---|
| Topic A | | [0.3, 0.2, 0.5, 0.1] | [0.4, 0.1, 0.1, 1.0] | [0.5, 0.2, 0.1, 0.05] |
| Topic B | [0.3, 0.2, 0.5, 0.1] | | [0.7, 0.9, 0.8, 0.7] | [0.7, 0.1, 0.1, 0.1] |
| Topic C | [0.4, 0.1, 0.1, 1.0] | [0.7, 0.9, 0.8, 0.7] | | [0.9, 0.05, 0.05, 0.1] |
| Topic D | [0.5, 0.2, 0.1, 0.05] | [0.7, 0.1, 0.1, 0.1] | [0.9, 0.05, 0.05, 0.1] | |

At method operation 304, a graphical lasso is applied to the covariance matrix to estimate a sparse graph. In the sparse graph, nodes correspond to the topics, and edges between the nodes have edge weights that are (at least approximately) defined by the values from the covariance matrix.

It will be appreciated that graphical lasso is one of many ways to estimate a sparse covariance matrix. Thus, while implementations of the present disclosure are described with reference to graphical lasso, it should be appreciated that in other implementations, other techniques for estimating a sparse covariance matrix can be applied.

By way of example, additional methods for estimating a sparse covariance matrix are described in the following papers, the disclosures of which are incorporated by reference:

Hsieh, C. J., Dhillon, I. S., Ravikumar, P. K. and Sustik, M. A., 2011. Sparse inverse covariance matrix estimation using quadratic approximation. In *Advances in neural information processing systems* (pp. 2330-2338).

Schäfer, J. and Strimmer, K., 2005. A shrinkage approach to large-scale covariance matrix estimation and implications for functional genomics. *Statistical applications in genetics and molecular biology*, 4(1), p. 32.

Yuan, M., 2010. High dimensional inverse covariance matrix estimation via linear programming *Journal of Machine Learning Research*, 11(August), pp. 2261-2286.

Cai, T., Liu, W. and Luo, X., 2011. A constrained $\ell$ 1 minimization approach to sparse precision matrix estimation. *Journal of the American Statistical Association*, 106(494), pp. 594-607.

Friedman, J., Hastie, T. and Tibshirani, R., 2008. Sparse inverse covariance estimation with the graphical lasso. *Biostatistics*, 9(3), pp. 432-441.

At method operation 306, a stochastic block algorithm/model is applied to the sparse graph, to partition the graph into clusters/communities of topics. Broadly speaking, the stochastic block model randomly traverses the sparse graph, and partitions the graph into different components by severing some of the weaker or unnecessary edges. In doing so, the stochastic block model maximizes intra-community interactions (which define the behavioral similarity of nodes within the same community, e.g. based on their covariance values) and minimizes inter-community interactions (which define the behavioral similarity of nodes from different communities, e.g. based on their covariance values). This results in a high number of connections between nodes within a given community and few connections between nodes of different communities.

The stochastic block algorithm computes these kinds of communities without significantly disturbing the sparse graph's overall original structure. To do so, a metric of minimum description length is utilized. That is, the number of edges in the new graph is minimized as compared to the original graph, while the difference between the sum of the weights of the edges in the original graph versus the new graph is minimized.

In some implementations, the stochastic block algorithm assigns soft membership to each topic with a posterior probability, and therefore it is possible to group a topic under several communities. Whereas in some implementations, the stochastic block algorithm assigns hard membership to each topic, such that each topic is a member of only one community.

The result of operations 302, 304, and 306 is a graph that identifies various clusters/communities of topics. That is, topics which exhibit similar behavioral patterns for the activity (or activities) analyzed according to the foregoing operations will tend to be clustered as part of the same community. Thus, the result enables identification of communities and the topics which constitute those communities.

At method operation 308, the identified communities are instantiated as objects/entities on the social platform, to which users may subscribe or otherwise gain access, being generated based on the clusters of topics which have been identified. At method operation 310, users are provided access to these communities. For example, in some implementations, a community can be accessed through the interface, wherein accessing a community further enables access to the topics which are contained within that community, and likewise access to any of the topics in the community further provides access to content/articles/postings within that topic.

Users may subscribe to a community, and in so doing, may be subscribed to all topics existing within that community, and may therefore receive in their personalized feed content from the various topics which are in that community. Additionally, users may post to a community, which can be configured to further effect posting to one or more of the topics within the community. In some implementations, a post to a community can be selectively configured by the user to be associated with one or more of the topics in that community.

It should be appreciated that the communities in the present disclosure have been identified through an automated process that may be implemented by at least one server computer. This is significant in that the communities are defined organically as a result of user activity occurring within the plurality of topics, and are identified and generated without requiring human editorial activity. These communities are latent as they are not explicitly defined at the outset, but are discovered through the methodology thus described. It will be appreciated that membership of topics within the communities may evolve over time, and thus, the particular topics within a given community can change over time, and new communities may come into existence and existing communities may cease to exist over time.

Figure 4:
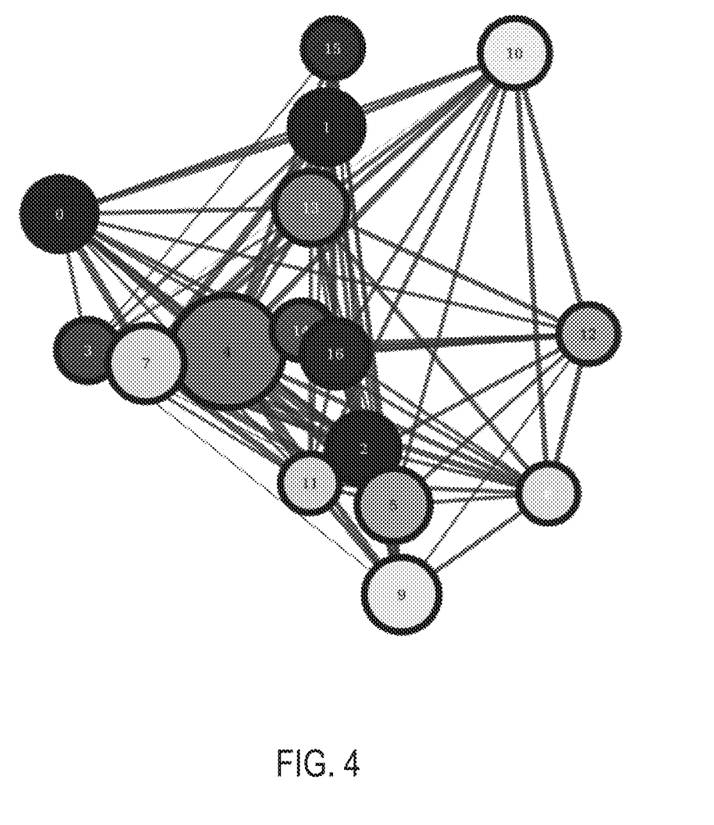
FIG. 4 is a graph visualizing a plurality of communities, in accordance with implementations of the disclosure.

FIG. 4 is a graph visualizing a plurality of communities, in accordance with implementations of the disclosure. In the illustrated implementation, each node is a community, and the size of the community indicates how many topics/vibes are in that community. The edge width between communities graphically indicates how much the nodes in the communities interact (inter-community interactions). Thus, for example, the nodes in community "3" and community "15" have fewer interactions with each other than the nodes in community "8" and community "10."

Figure 5:
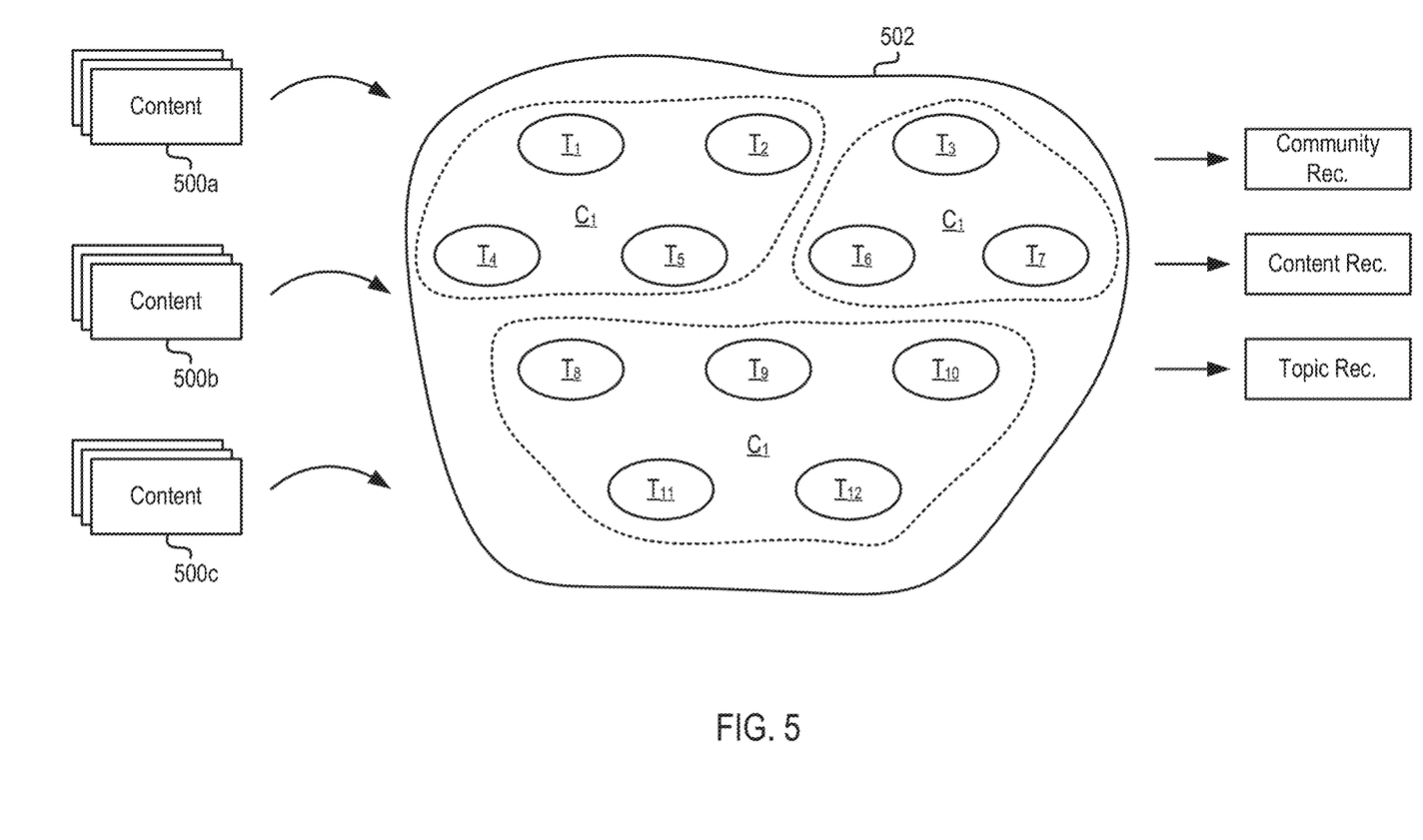
FIG. 5 conceptually illustrates the grouping of topics into various communities, in accordance with implementations of the disclosure.

FIG. 5 conceptually illustrates the grouping of topics into various communities, in accordance with implementations of the disclosure. As shown, various pieces of content 500a-c are posted to various topics 502, including topics $T_1$ to $T_{12}$. Users interact with the topics, including posting, viewing posts, commenting, endorsing, etc. These interactions are analyzed to identify topics which exhibit similar behavioral patterns over time. The topics which exhibit similar behavioral patterns are grouped into communities. In the illustrated implementation, a community $C_1$ is identified which includes topics $T_1$, $T_2$, $T_4$, and $T_5$; a community $C_2$ is identified which includes topics $T_3$, $T_6$, and $T_7$; and a community $C_3$ is identified which includes topics $T_8$, $T_9$, $T_{10}$, $T_{11}$, and $T_{12}$. The identification of these latent communities can be utilized to improve the user experience, such as by generating communities on the platform which the user may access/subscribe, recommending posts to the user, or recommending topics to the user (e.g. recommending a topic that is in the same community as one to which the user has subscribed).

The understanding of user behavior in accordance with implementations of the present disclosure can be utilized to provide community based content recommendation solutions. In some implementations, specific posts (or articles, content, etc.) can be recommended to particular users, at least in part, on the basis of community-defined parameters. For example, a post might be recommended to a user that is not within any of the topics that the user is currently following, but which is nonetheless within a topic in the same identified community as one or more of the topics that the user is currently following. The inclusion of such posts can effectively expand the corpus of posts that the system may draw upon for recommendation to the user, with a higher degree of confidence that such posts will be relevant to the user despite their falling outside of the user's explicitly subscribed topics.

In some implementations, a weighted ranking method that is applied to rank posts for recommendation to the user can include one or more weighting factors which are based on community affiliation. For example, a weighting factor for a given post can be assigned based on whether the given post is within a topic that is within a same community as topics to which the user has subscribed. In some implementations, a weighting factor can be assigned based on the strength of the intra-community interaction occurring between a topic to which the given post belongs and one or more topics to which the user has subscribed.

Throughout the present disclosure, reference is made to a user's subscriptions to specific topics. However, it will be appreciated that a user's topical interest can be inferred based on the user's viewing/browsing history. And therefore, in all such implementations, the user's subscribed topics can be replaced or supplemented with topics of interest that have been inferred from the user's activity.

In another application, the understanding of communities gained through the present methods can be used to recommend specific topics to a user. For example, a topic may be recommended to the user that is from the same community as another topic to which the user has subscribed. In some implementations, topics for recommendation are ranked based on the strength of their intra-community interaction with other topics to which the user has subscribed. Thus, the system may recommend topics in strongly connected communities to which the user has subscribed.

In some implementations, the system may enable users to subscribe to communities, which are dynamic sets of changing topics. For example, a "Politics" community may contain several related topics such as "Donald Trump," "Hillary Clinton," "Bill Clinton," "Debate 2016," etc. By subscribing to a community, the user may receive content in their personalized feed from the various topics that are within the community, without having to subscribe on an individual basis to each of the various topics in the community. Additionally, the particular topics within the community are dynamic, and may change over time based on user activity. For example, if the behavioral similarity of a given topic to other topics in the community reduces over time to the point that the topic is no longer identified in the same cluster, accordance with the methods described above, then the topic would be removed from the community. Conversely, a given topic's behavioral similarity to topics of a community may increase to the point that the given topic is identified in the same cluster and therefore added to the community. As community membership is dynamic, users are able to enjoy selections of content from relevant topics in a seamless manner with minimal user configuration of topics required.

In some implementations, a post to one topic may be automatically posted to one or more other topics within the same community. In some implementations, a post to one topic is posted to another topic within its community when the topics exhibit an intra-community interaction above a predefined threshold. By way of example, a post to a "Donald Trump" topic can be posted to other topics such as "Elections" that belong to same community with higher confidence. This avoids the problem of users having to manually "repost" a post from the "Donald Trump" topic to the "Elections" topic. As noted above, one could also post to the relevant community instead of a specific topic, and thereby post to all of the topics in that community.

In some implementations, community affiliation can be used to guide placement of topics when presented to a user. For example, topics from the same community can be placed in proximity to each other. Or the system can be configured to avoid placing unrelated topics next to each other. For example, topics such as "Yahoo" and "Google" should not be placed next to topics such as "War on Drugs" and "Al Qaeda."

By automatically learning the structure of the underlying latent communities, system performance is improved in terms of both recommending topics that a user might be interesting in following and in ranking user posts. These improvements lead to increased product performance and better user retention on the social platform.

Because it observes user activity over time, i.e., it is temporally-dynamic, the system can capture the dynamics of an ever-evolving social network. Existing systems today require the use of editors to accomplish this. Having an algorithmic-based solution is faster and more cost efficient.

Modeling and visualization of the latent communities comprising platform users and topics can be used both for informational dashboards and exploratory analysis. For example, editorial views can be provided showing the relationships amongst topics, the relative strengths of such relationships, the trends in the relative strengths, the composition of communities, the trends in user activity by topic and community, etc.

In some implementations, analysis of social signals and moderator activity such as removing abusive posts might lead to analyses that group topics that tend to have such activity in the same community. This system could thus use this information as a way to curate topics and perhaps make them less visible on the platform.

In some implementations, the system populates a community with certain topics/vibes, and the user has the option of removing or adding new topics to the community. For example, users could graphically drag/drop topics in or out of a community. This could be monitored as feedback to the system regarding whether the user agrees that a given topic should be included in a community, and be used to adjust the modeling system.

In some implementations, the name of the community itself can be assigned by the system, assigned by an editor, and/or determined or edited by a user. There can be dynamically changing labels for communities, e.g. based on user determination and topic inclusion in the communities.

In some implementations, when a user subscribes to a community, the user is then automatically subscribed to various topics within that community.

In some implementations, initially, the user can be presented with a number of suggested communities, which have been determined through analysis of the topics. This serves to ease the initial setup of the application, so that the user does not have to browse through a large number of topics, but can select from a more limited number of communities.

As noted above, similar topics can be shown next to each other. Additionally, a hierarchical structure of topics can be systematically generated based on identified communities. For example, a technology community might include internet technology topics, which in turn might include travel internet and ecommerce internet topics.

Figure 6:
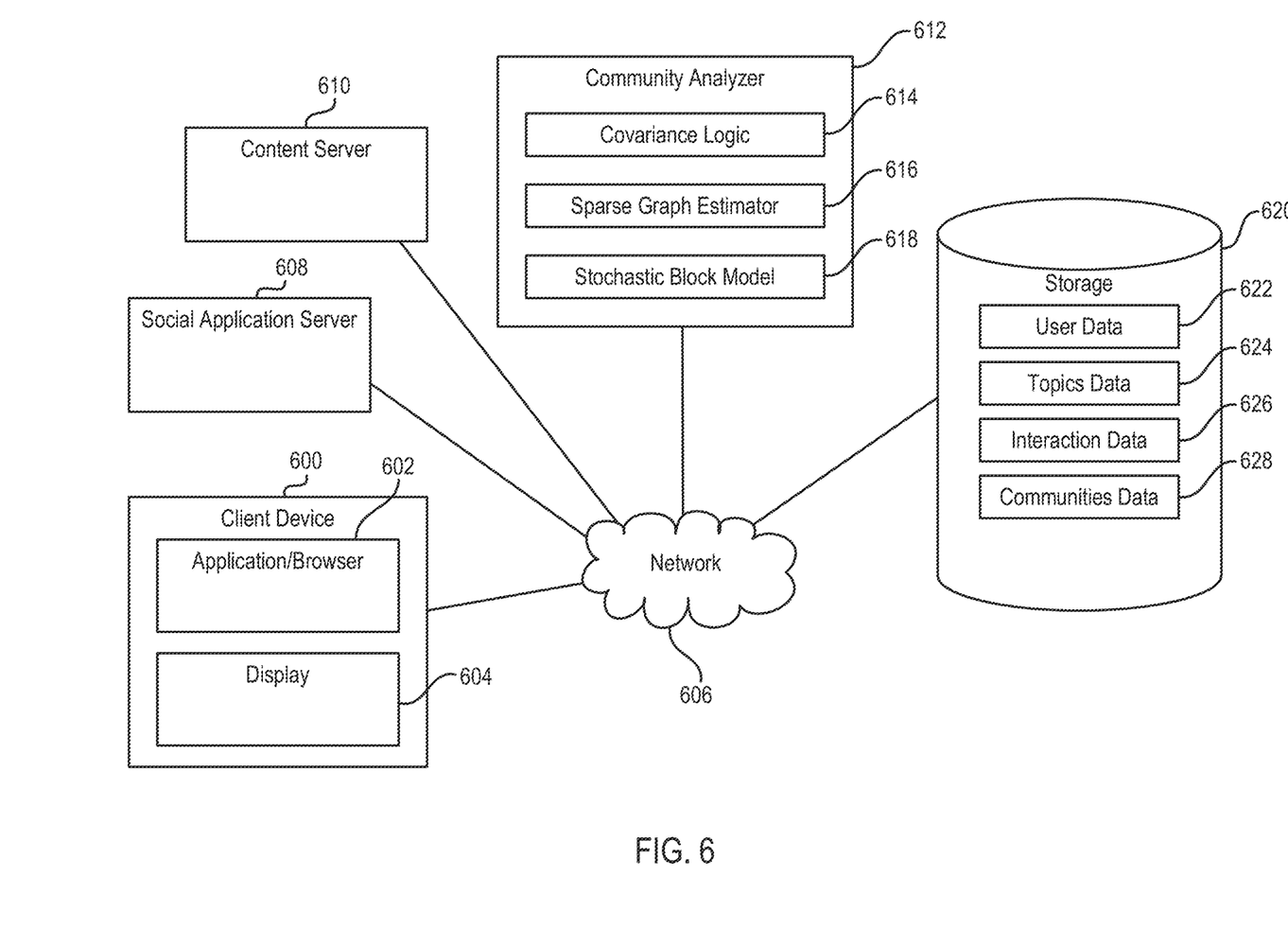
FIG. 6 illustrates a system for providing community-based solutions in a social sharing platform, in accordance with implementations of the disclosure.

FIG. 6 illustrates a system for providing community-based solutions in a social sharing platform, in accordance with implementations of the disclosure. Broadly speaking, the system can be configured to perform any of the methods described in accordance with implementations of the present disclosure. A client device 600 is operated by a user to access a social sharing platform that uses a plurality of topics. The client device 600 executes an application 602 (which in some implementations, may be a browser application or a web application) that is configured to render to the display 604 of the client device 600 an interface for interacting with the social sharing platform. The application 602 may communicate over a network 606 (e.g. the Internet) with a social application server 608 to obtain data so that the user may access the social sharing platform, including accessing topics, content within topics, a personalized feed, etc.

It will be appreciated that in some implementations, content can be obtained from a separate content server 610 for rendering in the context of the interface that is rendered on the client device 600. For example, in a given topic, and preview of an article from a $3^{rd}$ party news source may be provided, and accessing the article may redirect to obtain content from the $3^{rd}$ party news source's content server.

A storage 620 is configured to store user data 622, which includes user profile information as well as users' platform related information, such as the topics to which users are subscribed. Topics data 624 includes data that defines the contents of a given topic, including identifiers of content that are included in the given topic. Interaction data 626 includes data that describes activity occurring within each of the topics. Communities data 628 includes data defining the communities on the platform, including identification of which topics are members of which communities.

A community analyzer 612 is configured to analyze the interaction data 626 in accordance with methods described above, to determine clusters of topics and generate/edit communities on the platform. A covariance logic 614 is configured to determine a covariance amongst the topics, for example by determining a covariance matrix for the topics. A sparse graph estimator 616 can be configured to apply a graphical lasso or other technique to estimate a sparse graph based on the covariance. A stochastic block model 618 is applied to identify clusters of topics, which serve to define communities on the social sharing platform. As noted above, these identified communities can be leveraged in various ways to improve the user experience and the platform's performance.

Figure 7:
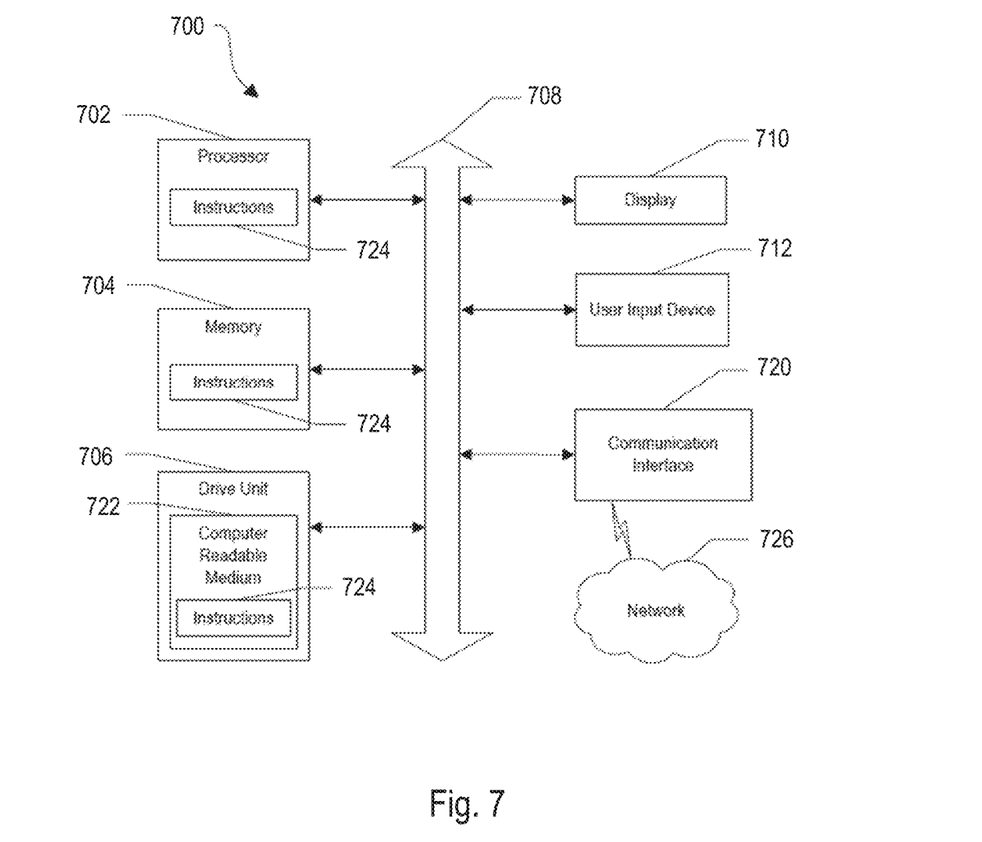
FIG. 7 illustrates an implementation of a general computer system, in accordance with an implementation of the disclosure.

FIG. 7 illustrates an implementation of a general computer system designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 700 may further include a display unit 710, such as a liquid crystal display (LCD), an organic light emitting diode (OLED), a flat panel display, a solid state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the computer system 700.

The computer system 700 may also or alternatively include a disk or optical drive unit 706. The disk drive unit 706 may include a computer-readable medium 722 in which one or more sets of instructions 724, e.g. software, can be embedded. Further, the instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 726 can communicate voice, video, audio, images or any other data over the network 726. Further, the instructions 724 may be transmitted or received over the network 726 via a communication port or interface 720, and/or using a bus 708. The communication port or interface 720 may be a part of the processor 702 or may be a separate component. The communication port 720 may be created in software or may be a physical connection in hardware. The communication port 720 may be configured to connect with a network 726, external media, the display 710, or any other components in system 700, or combinations thereof. The connection with the network 726 may be a physical connection, such as a wired Ethernet connection or may be established wirelessly as discussed below. Likewise, the additional connections with other components of the system 700 may be physical connections or may be established wirelessly. The network 726 may alternatively be directly connected to the bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to one or more networks 726. The network 726 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 726 may include wide area networks (WAN), such as the Internet, local area networks (LAN), campus area networks, metropolitan area networks, a direct connection such as through a Universal Serial Bus (USB) port, or any other networks that may allow for data communication. The network 726 may be configured to couple one computing device to another computing device to enable communication of data between the devices. The network 726 may generally be enabled to employ any form of machine-readable media for communicating information from one device to another. The network 726 may include communication methods by which information may travel between computing devices. The network 726 may be divided into sub-networks. The sub-networks may allow access to all of the other components connected thereto or the sub-networks may restrict access between the components. The network 726 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method implemented by at least one server computer, comprising:

providing access to a plurality of topics, wherein each topic includes, and provides access to, a plurality of posted items;

recording interaction data of a plurality of users for the plurality of topics, the interaction data identifying user activity occurring within each of the plurality of topics;

analyzing the interaction data of the plurality of users to group two or more topics that exhibit similar activity-behavioral patterns into a cluster of topics, wherein the grouping comprises grouping a first topic of the two or more topics and a second topic of the two or more topics into the cluster of topics based on first user activity within one or more first activity-behavioral patterns of the first topic having one or more first changes in a time-dependent metric and second user activity within one or more second activity-behavioral patterns of the second topic having one or more second changes in the time-dependent metric that are similar to the one or more first changes in the time-dependent metric;

generating a community that includes topics in the cluster of topics; and providing access to the community, wherein accessing the community provides access to the topics included in the community, and the topics included in the community provide access to posted items that are included in the topics included in the community.

2. The method of claim 1, comprising:
generating a covariance matrix using the interaction data.

3. The method of claim 2, comprising:
applying a graphical lasso to the covariance matrix.

4. The method of claim 1, wherein the interaction data includes a number of at least one of active users, posted items, or comments.

5. The method of claim 1, wherein the interaction data includes a number of at least one of votes, positive endorsements, negative endorsements, abuse flags, or moderator actions.

6. The method of claim 1, wherein providing access to a given topic includes providing an interface for posting items within the given topic, and for interacting with posted items in the given topic, and wherein the interaction data includes data obtained via the interface.

7. The method of claim 1, wherein the plurality of posted items include news articles.

8. A method implemented by at least one server computer, comprising:

providing access to a plurality of topics, wherein each topic includes, and provides access to, a plurality of posted items;

recording interaction data for the plurality of topics, the interaction data identifying user activity occurring within each of the plurality of topics;

analyzing the interaction data to group two or more topics that exhibit similar behavioral patterns into a cluster of topics, wherein the similar behavioral patterns exhibited by the two or more topics correspond to user activity within the two or more topics having similar changes in a time-dependent metric;

using the cluster of topics to identify topics for recommendation to a user; and presenting the topics identified for recommendation in a session for the user.

9. The method of claim 8, wherein the topics identified for recommendation are identified based on identifying a topic to which the user has subscribed.

10. The method of claim 9, wherein the topics identified for recommendation are identified based on identifying one or more topics that are within a same cluster as the topic to which the user has subscribed.

11. The method of claim 8, comprising:
generating a covariance matrix using the interaction data; and
applying a graphical lasso to the covariance matrix.

12. The method of claim 8, wherein the interaction data includes a number of at least one of active users, posted items, or comments.

13. The method of claim 8, wherein the interaction data includes a number of at least one of votes, positive endorsements, negative endorsements, flags, or moderator actions.

14. The method of claim 8, wherein providing access to a given topic includes providing an interface for posting items within the given topic, and for interacting with posted items in the given topic, and wherein the interaction data includes data obtained via the interface.

15. The method of claim 8, wherein the plurality of posted items include news articles.

16. A method implemented by at least one server computer, comprising:
providing access to a plurality of topics, wherein each topic includes, and provides access to, a plurality of posted items;
recording interaction data for the plurality of topics, the interaction data identifying user activity occurring within each of the plurality of topics;
analyzing the interaction data to group two or more topics that exhibit similar behavioral patterns into a cluster of topics, wherein the similar behavioral patterns exhibited by the two or more topics correspond to user activity within the two or more topics having one or more similarities; and
using the cluster of topics to recommend user-posted items.

17. The method of claim 16, wherein using the cluster of topics to recommend user-posted items includes identifying a first topic to which a user has subscribed.

18. The method of claim 17, wherein using the cluster of topics to recommend user-posted items includes identifying a second topic that is within a same cluster as the first topic.

19. The method of claim 18, wherein using the cluster of topics to recommend user-posted items includes recommending in a session of the user a posted item from the second topic.

20. The method of claim 16, wherein the interaction data defines a time-dependent metric for user activity within the plurality of topics, and wherein a similar behavioral pattern for a given cluster of topics is defined by similar changes in the time-dependent metric occurring over time for the given cluster of topics.

* * * * *